March 31, 1959  M. DUBITZKY ET AL  2,879,943

INSTANTANEOUS LIQUID HEATER

Filed June 6, 1955  3 Sheets-Sheet 1

INVENTORS
MICHAEL DUBITZKY
THOMAS S. HARGREAVES
DONALD E. KEYT
BY
AGENT

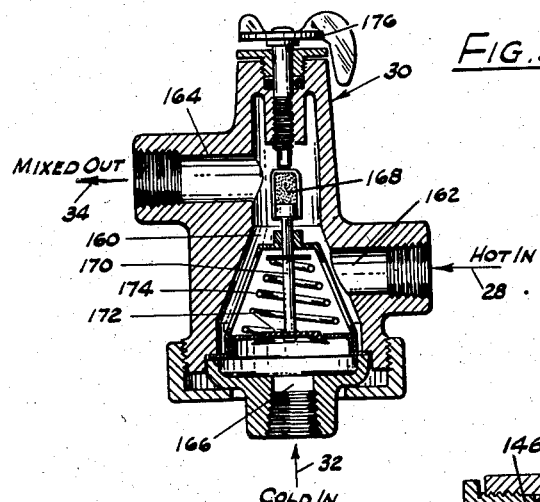
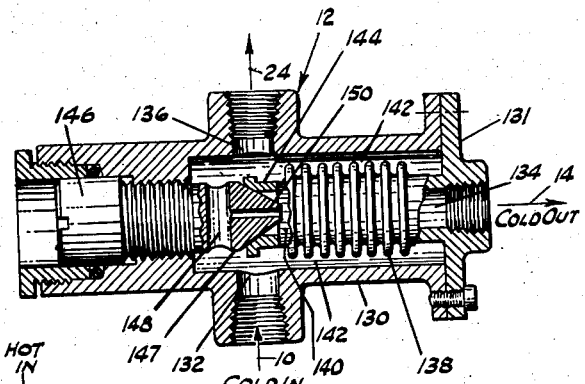
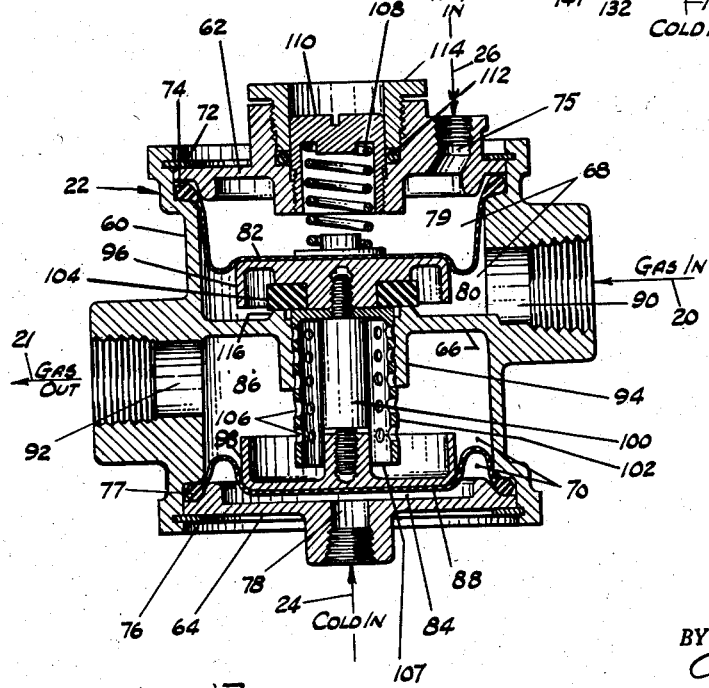

United States Patent Office 2,879,943
Patented Mar. 31, 1959

2,879,943
INSTANTANEOUS LIQUID HEATER

Michael Dubitzky, Stoneham, Mass., Thomas S. Hargreaves, Louisville, Ky., and Donald E. Keyt, Boston, Mass.; said Dubitzky and said Keyt assignors to Arthur D. Little, Inc., Cambridge, Mass., a corporation of Massachusetts; said Hargreaves assignor to Clayton & Lambert Manufacturing Co., Louisville, Ky., a corporation of Delaware Application June 6, 1955, Serial No. 513,361

1 Claim. (Cl. 236—25)

This invention relates to a tankless heating device for providing instantaneously a supply of hot liquid at a predetermined temperature and within a wide range of flow. While this invention is useful in the heating of liquids generally, it is especially useful in providing continuous hot water supply, e. g. for domestic hot water and heating.

Present day gas water heaters as a rule comprise either a storage tank or a heating coil associated with a supply of fuel gas which is ignited when water is drawn. Tank type heaters, due to their low heat input rates, depend on the size of their tanks for their ability to supply hot water over sustained periods of water draw. When this capacity has been exhausted, only cold or partially heated water can be drawn until the heater has had time to reheat the whole tank of water at its low heating rate. Coil type heaters usually have sufficient capacity to deliver hot water continuously at high flow rates. However, having no storage capacity, they have difficulties in maintaining uniform outlet temperatures at varying flow rates.

It is an object of the present invention to provide a device capable of continuously supplying hot water, or other hot liquid, at a desired temperature and within a wide range of flow.

Another object is to provide such a device which does not require a storage tank or reservoir.

Another object is to provide such a device which is capable of supplying hot water or other liquid at a temperature which is maintained within about 2° F. of a predetermined desired temperature.

Still another object is to provide a device of the type described which is compact and safe.

Another object is to provide a suitable type of modulating control valve adapted to regulate the flow of the fuel, or other fluid, in response to flow changes of the water or other fluid being heated or handled, and not affected by the supply pressure of the latter fluid.

A further object is to provide a suitable type of pressure drop compensator adapted to adjust the pressure of the liquid being heated, for optimum operation of the modulating control valve.

Additional objects and advantages will appear hereinafter.

Briefly stated, the heating device of this invention consists of out-of-contact heat-exchange means through which flows the liquid to be heated, first conduit means for conveying the liquid from a source to the heat-exchange means, second conduit means leading from the heat-exchange means toward a point of use of the heated liquid, heating means for supplying heat to said heat-exchange means, control means for automatically adjusting the heat provided by the heating means in proportion to the rate of flow of liquid through the heat exchanger, a bypass conduit communicating between said first conduit means and said second conduit means and adapted to bypass said heat-exchange means, and valve means located in said bypass conduit and controlled by the temperature of the liquid in said second conduit means for regulating the flow through said by-pass conduit to provide a uniform predetermined temperature of the liquid leaving said second conduit. The point at which said temperature of the liquid in said second conduit means is measured is downstream from the point at which said bypass conduit enters. Located in said first conduit means is a pressure drop compensator adapted to regulate the pressure differential of the liquid across the aforesaid control means in response to varying rates (especially low rates) of liquid flow.

This invention will now be described in detail in connection with the following drawings, which are to be considered as illustrative rather than limiting, and in which:

Fig. 3 represents a cross-sectional view of a novel type of modulator control valve especially useful in the system of this invention;

Fig. 4 represents a cross-sectional view of a novel type of pressure drop compensator for use in this system; and Fig. 5 represents a cross-sectional view of a suitable type of temperature regulating valve for use in this system.

Figure 1:
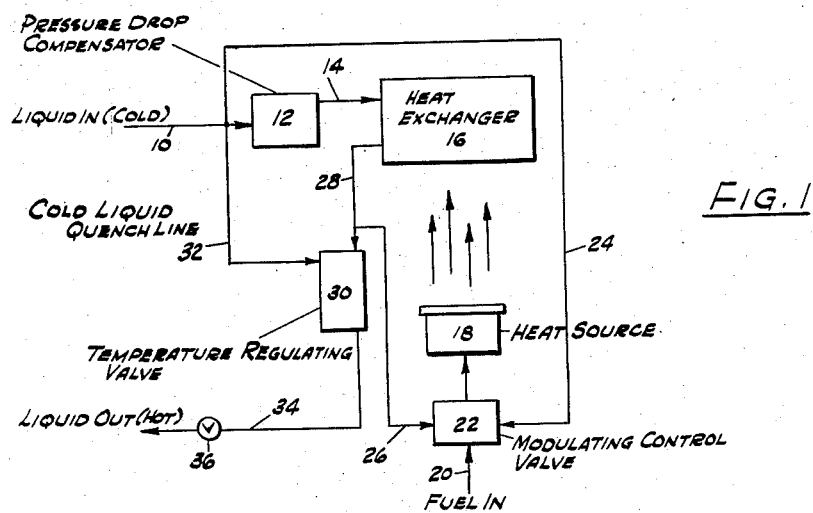
Fig. 1 represents a schematic flow diagram of the system of this invention.

In the system as shown in Fig. 1, there is provided an inlet line 10 for the liquid to be heated, communicating through pressure drop compensator 12 and line 14 with heat exchanger 16. Heat source 18 provides heat for heat exchanger 16, by burning of fuel fed in through supply line 20 and modulating control valve 22. This valve 22 is controlled by the pressure differential exerted via cold liquid line 24 and hot liquid line 26, in a manner described hereinafter. Line 26 leads off from the main hot liquid line 28 passing out from heat exchanger 16 to temperature regulating valve 30, into which valve also leads cold liquid quench line 32 from inlet line 10. Outlet line 34 conveys the heated liquid, at the desired temperature, to the point of use. This line is controlled by a valve 36, which may be the valve (e. g. a faucet) at the point of use.

When the system shown in Fig. 1 is not in use (i. e. when there is no demand for hot liquid), the pressures in lines 24 and 26 are in equilibrium and modulating control valve 22 is closed to the admission of fuel from line 20. Hence no heat is provided from source 18.

When hot liquid is desired, the opening of valve 36 causes a drop in the pressure in line 34, and hence in lines 28 and 26. Since communication between line 32 and regulating valve 30 is closed at this stage, the pressure in line 26 is lower than that in line 24 due to the pressure drop through compensator 12 and heat exchanger 16. This pressure differential between lines 24 and 26 causes modulating control valve 22 to pass fuel from line 20 to heat source 18, where the fuel is burned and heat passes directly to heat exchanger 16 to heat the liquid therein. This heat exchanger may advantageously be made of one or more banks of coiled finned tubing, thus promoting rapid heating of the liquid.

As soon as the liquid flowing out through line 34 has reached the desired temperature, accurate control of that temperature is insured as follows: Any increase above the desired temperature is immediately prevented by actuation of the temperature regulating valve 30, which thereupon admits enough cold liquid through quench line 32 to maintain the desired temperature. This also causes an increase in the pressure in line 26 (and hence a decrease in the pressure differential between lines 26 and 24) thereby cutting down on the amount of fuel supplied from line 20 through modulating control valve 22. Any tendency for the temperature of the liquid in line 34 to decrease below the desired temperature is offset by the automatic closing of communication between quench line 32 and temperature regulating valve 30, and hence there is an increase in pressure differential between lines 24 and 26 whereby more fuel is supplied through modulating control valve 22 to heat source 18.

Figure 2:
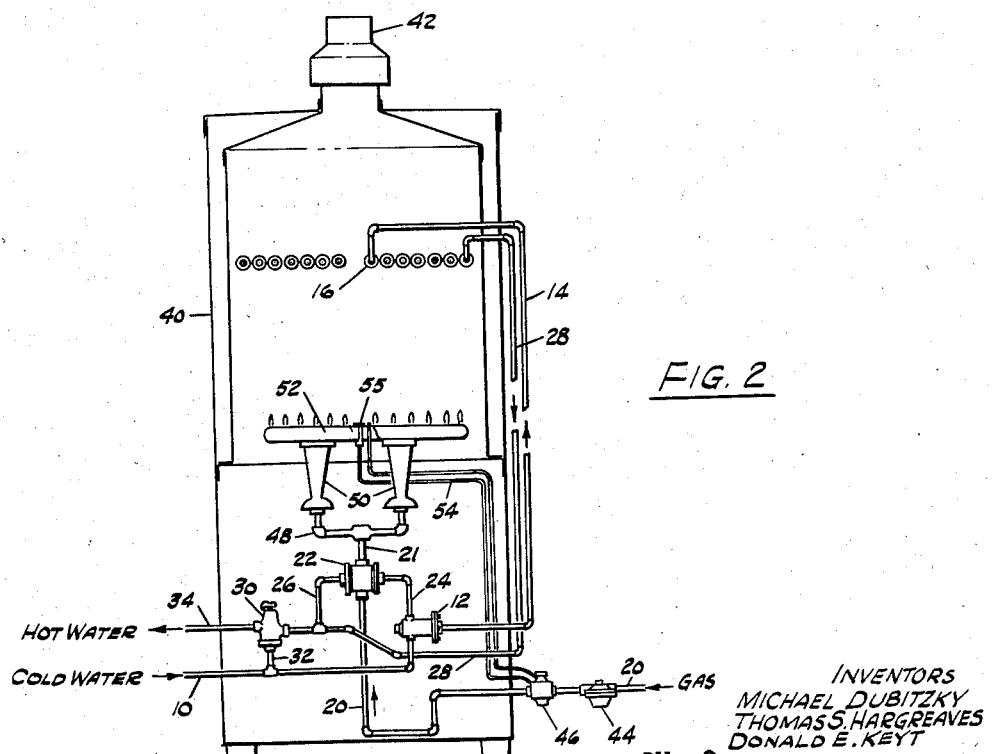
Fig. 2 represents a schematic diagram of a preferred arrangement of the system of this invention.

In Fig. 2 there is shown a form of the system described above which is especially useful for providing constant-temperature domestic hot water, using gaseous fuel for heating. In Figs. 1 and 2, like numerals refer to like parts. The system shown in Fig. 2 may be enclosed in a suitable housing 40 provided with a vent 42 for products of combustion of the gaseous fuel. Cold water inlet line 10 communicates through pressure drop compensator 12 with line 14 leading to heating coil 16. In gas supply line 20 leading to modulating control valve 22 are located a conventional gas pressure regulator 44 and a conventional automatic pilot 46. Gas conduit 21 leads out of modulating control valve 22 to manifold 48, which in turn communicates with injectors 50 leading to gas burner 52. A gas line 54 leads from automatic pilot 46 to a pilot light 55 at burner 52 to provide for lighting the gas at the burner whenever gas is admitted thereto by operation of modulating control valve 22. On the upstream side of the operating mechanism of pressure drop compensator 12 (and hence having the same water pressure as in line 10) is cold water line 24 leading to one side of modulating control valve 22, while hot water line 26 communicates with the other side of said valve and with the main hot water line 28 which leads away from heating coil 16. Line 28 leads to temperature regulating valve 30 and thence to hot water outlet line 34; cold water quench line 32 leads to valve 30 from line 10.

The operation of the system shown in Fig. 2 will be clear from the foregoing remarks and from the description of the operation of the system of Fig. 1, with the following additional remarks: The pilot light 55 is always burning, and acts to ignite gas emanating from burner 52 as mentioned above. Burning of this gas heats the water in heating coil 16, and the resulting combustion gases pass off through vent 42 which is ordinarily connected with a flue or chimney to carry such gases away to a suitable point of discharge. Insulation may be provided in the walls of housing 40. Heating coil 16 may be made multiple, and with fins on the tubing, or in whatever manner is desirable for attaining prompt heating of the water therein and in the desired range of flow rates of such water.

Details of various components of the above-described system will now be pointed out.

The modulating control valve 22 is shown in detail in Fig. 3, to which reference will now be made. This valve, represented by the numeral 22 as before, is made up of a generally cylindrical body 60 provided with covers or closures 62, 64—one at each end—and a gas-tight partition wall 66 separating the valve into two chambers 68 and 70. Cover 62 is held down tightly, by snap ring 72, against diaphragm O-ring seal 74, thus affording a fluid-tight seal between cover and body. Inlet 75 is provided in cover 62, communicating with hot liquid line 26 (Figs. 1 and 2). Cover 64 is similarly held down in fluid-tight relation to body 60 against diaphragm O-ring seal 77 by snap ring 76. Inlet 78 is provided in cover 64, communicating with cold water line 24 (Figs. 1 and 2).

Chamber 68 is divided into a hot liquid chamber 79 and an inlet fuel gas chamber 80 by fluid-tight flexible diaphragm 82, which is essentially frictionless and may be made for example of fabric coated or impregnated with neoprene synthetic rubber. This diaphragm terminates at its circumference in integral O-ring seal 74.

Similarly, chamber 70 is divided into a cold liquid chamber 84 and an outlet fuel gas chamber 86 by a similar fluid-tight diaphragm 88, which terminates at its circumference in integral O-ring seal 77.

Gas supply line 20 (Figs. 1 and 2) communicates with opening 90 in body 60 leading into inlet fuel gas chamber 80. Opening 92 leads from outlet fuel gas chamber 86 to gas conduit 21 (Fig. 2).

Partition 66 is provided with a guide sleeve 94 supporting a piston assembly which is composed of inlet head 96, outlet head 98, rod 100 connecting these two heads, valve sleeve 102, and valve seating disc 104, all connected together to move in unison. Valve sleeve 102 is provided with a number of holes or openings 106, and is arranged so that it can slide back and forth readily in guide sleeve 94 as the piston assembly moves back and forth. Valve sleeve 102 is open at one end 107, and closed at the other end against head 96.

Spring 108 is mounted at one end in cover 62 and at the other end presses against diaphragm 82 which lies against head 96, thereby exerting pressure against the latter. This pressure may be regulated by turning spring adjusting nut 110. The O-ring seal 112 provides fluid-tight relation between nut 110 and cover 62; this seal is compressed by cover nut 114. When spring 108 is extended as far as possible, valve seating disc 104 seats tightly against annular shoulder 116 of partition wall 66, thereby effectively cutting off gas communication between chambers 80 and 86.

Operation of modulating control valve 22 is as follows: When there is no demand for hot liquid, the pressure in hot liquid chamber 79 is substantially the same as that in cold liquid chamber 84; spring 108 has only its initial compression and disc 104 is firmly seated against shoulder 116, in the position shown in Fig. 3. Therefore no gas flows in through opening 90 or out through opening 92, as inlet fuel gas chamber 80 is sealed off from chamber 86, and accordingly no gas is fed to burner 52 (Fig. 2). Demand for hot liquid immediately causes a pressure drop in hot liquid lines 26 and 28—as explained above in connection with Fig. 1—and hence in chamber 79. There is thus established a pressure differential between that of the liquid in chamber 84 and that of the liquid in chamber 79, the latter being at lower pressure. The liquid pressure in chamber 84, by pressing against head 98, forces the piston assembly against spring 108 (i. e. upwardly, in the position shown in Fig. 3), thus causing disc 104 to move away from shoulder 116 and valve sleeve 102 to slide upwardly in guide sleeve 94. This movement uncovers some of holes 106, through which gas moves from chamber 80 and out through valve sleeve end opening 107 into chamber 86. Communication is thus set up between gas supply line 20 and gas conduit 21 (Fig. 2), thereby providing gas for burner 52. The greater the pressure differential between chamber 84 and chamber 79, the further the piston assembly moves toward cover 62, and the larger the number of holes 106 uncovered, hence the larger the gas flow through the modulating control valve 22. As the demand for hot liquid falls off, the aforesaid differential decreases and the piston assembly is moved an appropriate distance toward closed position. A suitable flow of gas is thus provided.

It should be understood, however, that the modulating control valve 22 can be placed in any position which is convenient for the particular design of system desired.

It should also be pointed out that modulating control valve 22 is of general utility in controlling the flow of one fluid (gaseous or liquid) in response to pressure differentials in another flowing fluid (gaseous or liquid).

The pressure drop compensator assembly is indicated (as in Figs. 1 and 2) by the numeral 12, into which the liquid inlet line 10 leads and from which line 14 leads to the heat exchanger 16 and line 24 to the modulating control valve 22 (see Fig. 2). Compensator 12 is made up of a body 130, and a cover 131; these are provided with a liquid inlet 132 communicating with line 10, a liquid outlet 134 communicating with line 14, and another liquid outlet 136 communicating with line 24. Within the compensator and spaced away from the inner walls thereof is a bellows 138, forming an inner chamber 140 within said bellows and an outer chamber 142 between it and the inner walls of body 130. This bellows 138 is attached fluid-tight to cover 131, surrounding outlet 134. The other end 144 of bellows 138 is open, but can be closed by contact with adjusting needle 146, which is threaded into the end of body 130 opposite cover 131 and which has a tapered nose 147 fitting into end 144 of bellows 138. By turning needle 146 its position can be adjusted inwardly or outwardly a suitable distance, in order to bear with the desired slight pressure against the end 144 of bellows 138. An opening 148 is drilled into needle 146, communicating with chamber 142, and a small fixed orifice 150 communicates between opening 148 and inner chamber 140.

Operation of compensator 12 is as follows: When there is a demand for hot liquid, the pressure in line 34 (Figs. 1 and 2), and consequently in line 14, falls below that in line 10, as already explained. Hence bellows 138 moves away from needle 146 against its own spring force, thereby admitting liquid into chamber 140, from chamber 142 and line 10, for discharge into line 14. When the demand for hot liquid ceases, the bellows 138 due to its configuration moves back into the position shown in Fig. 4, thereby closing end 144.

When the demand for liquid is very small, such as from a leaky faucet, a substantial amount of the required liquid will pass from chamber 142 to chamber 140 through opening 148 and orifice 150, without enough pressure drop to cause the opening of the modulating control valve 22 to the flow of fuel gas therethrough.

Figure 6:
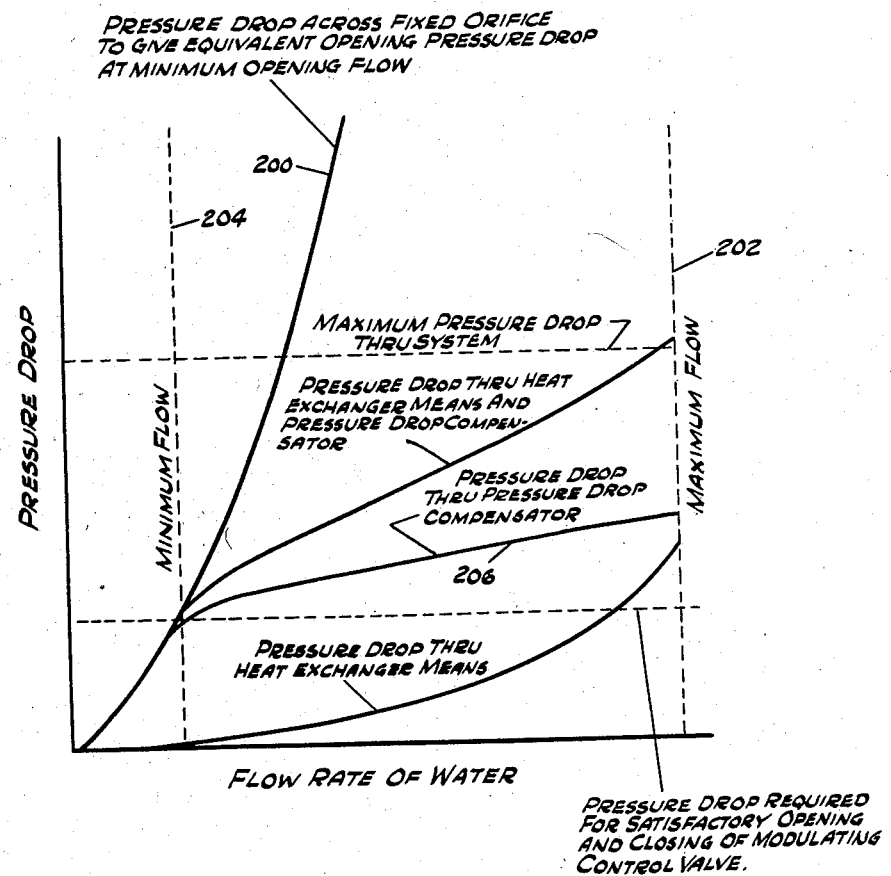
Fig. 6 represents a graphical showing of the relation of pressure drop to water flow through the pressure drop compensator.

The pressure drop through the heat exchange means increases in proportion to the square of the rate of flow of the liquid through it. (See Fig. 6). When the flow through it is high, the pressure drop through it is sufficient to operate the modulating control valve, but at low flows, the pressure drop is insufficient to actuate the latter valve. If a fixed orifice were placed in series with the heat exchange means to give sufficient pressure drop to operate the modulating valve at low flows, its pressure drop at higher flows becomes unsatisfactorily high (as shown in curve 200, Fig. 6). Therefore to obtain the pressure drop required to open the modulating valve at low flows and still maintain at a reasonable level the pressure drop at maximum water flow (line 202, Fig. 6) through the system, the pressure drop compensator shown in Fig. 4 is used instead of a fixed orifice in series with the heat exchange means. The orifice 150 acts as the fixed orifice for small rates of flow, providing sufficient pressure drop to open the modulating valve. For such small flows, the only opening between chambers 140 and 142 is the orifice 150. As the flow increases above the predetermined minimum flow rate for opening of the modulating valve (line 204, Fig. 6), the pressure drop from outer chamber 142 to inner chamber 140 becomes so great as to overcome the initial compression of the bellows 138 and thus force end 144 toward outlet 134, thereby opening the variable orifice between end 144 and nose 147. As the water flow through the pressure drop compensator continues to increase toward the maximum (line 202, Fig. 6), the pressure drop through it will increase only slightly (curve 206, Fig. 6), since any increase in pressure drop through the compensator will tend to compress the bellows 138 still more and thus increase the size of the opening of the aforesaid variable orifice.

There is thus provided in combination with the modulating control valve a system which will cause said valve to positively open at rates of fluid flow above a predetermined minimum volume, and positively close at rates of flow below that volume. The pressure drop compensator here described is thus capable of amplifying or attenuating pressure signals so that they can be used for operating such devices as the modulating control valve 22. It compensates the system against the effects of otherwise excessive pressure (the effects of which are illustrated by line 200, Fig. 6), while still serving to operate the modulating control valve at relatively low pressures (e.g. substantially where lines 200 and 206 intersect). Otherwise stated, the pressure drop compensator provides a moderate pressure drop or differential at low flows, and a not excessive drop or differential at high flows, as illustrated by line 206. It is therefore obvious that this pressure drop compensator can be used in other systems where the above-described type of control of fluid flow is desired.

Temperature regulating valve 30 may be of any standard type, of which a suitable one is shown in Fig. 5. Valve 30 has an inner chamber 160, opening 162 through which hot liquid line 28 communicates with said chamber, opening 164 leading out of said chamber to outlet line 34, and opening 166 into which cold liquid quench line 32 leads. Within chamber 160 is a thermostatic element 168 which is connected by rod 170 to by-pass valve 172, this latter being urged tightly to closed position by spring 174. Temperature adjustment means 176 is provided so that the thermostatic element 168 can be positioned to actuate valve 172 at whatever temperature of hot liquid may be desired at the point of use.

Whenever the hot liquid flowing into chamber 160 from line 28 exceeds the predetermined temperature desired for the hot liquid delivered from the system, thermostatic element 168 operates to open valve 172 and admit cold liquid from quench line 32 into chamber 160. The distance to which valve 172 is opened depends upon the temperature of the hot liquid entering through opening 162, thus controlling the amount of cold liquid admitted through the quench line 32. This control on the amount of cold water metered through the quench line, combined with a corresponding decreased rate of fuel admitted to the burner through the modulating control valve, as previously explained, provides the aforesaid predetermined temperature of liquid flowing out of the system.

There is accordingly provided a system having a group of interacting controls which cooperate to maintain the temperature of the hot liquid delivered at within about 2° F. of a predetermined desired temperature.

Various modifications in the apparatus and system of this invention, within the scope of the accompanying claim, will be apparent to those skilled in the art. For example, in the modulating control valve (Fig. 3), the gas or other fluid may be led in through opening 92, and out through opening 90, the construction and operation of said valve being otherwise the same as hereinabove described.

We claim:

Control means for regulating the rate of flow of a primary fluid with respect to the rate of flow of a stream of secondary fluid through a processing device, comprising valve means movable from closed to any intermediate and to fully open position, thereby to regulate the flow of said primary fluid from zero flow to a predetermined maximum rate, respectively, spring means, and first fluid pressure means responsive to the pressure of said secondary fluid downstream from said processing device, adapted to urge said valve toward closed position, and second fluid pressure means responsive to the pressure of said secondary fluid upstream from said processing device adapted to urge said valve toward open position, whereby said valve is moved responsive to differences in pressure between that exerted upon said first fluid pressure means and that exerted upon said second fluid pressure means to regulate the flow of said primary fluid therethrough, said second fluid pressure means being provided with regulating means adapted to prevent the opening of said valve means when the rate of flow of said stream of secondary fluid through said processing device is below a predetermined amount.

References Cited in the file of this patent

UNITED STATES PATENTS

| | | |
|---|---|---|
| 689,890 | Kull | Dec. 31, 1901 |
| 1,135,063 | Shepard | Apr. 13, 1915 |
| 1,939,330 | Ackermann | Dec. 12, 1933 |
| 2,034,123 | Treiber | Mar. 17, 1936 |
| 2,177,731 | Long | Oct. 31, 1939 |
| 2,287,840 | Stratton | June 30, 1942 |
| 2,326,096 | Dillman | Aug. 3, 1943 |
| 2,340,489 | Pontius | Feb. 1, 1944 |
| 2,369,242 | Lawler | Feb. 13, 1945 |
| 2,515,885 | Midyette | July 18, 1950 |
| 2,676,613 | Baxter | Apr. 27, 1954 |

FOREIGN PATENTS

| | | |
|---|---|---|
| 500,008 | Great Britain | Feb. 1, 1939 |
| 434,770 | Great Britain | Sept. 9, 1935 |
| 456,321 | Great Britain | Nov. 6, 1936 |